(12) United States Patent
Larish

(10) Patent No.: US 11,943,210 B2
(45) Date of Patent: Mar. 26, 2024

(54) SYSTEM AND METHOD FOR DISTRIBUTED, KEYLESS ELECTRONIC TRANSACTIONS WITH AUTHENTICATION

(71) Applicant: VERIZON PATENT AND LICENSING INC., Basking Ridge, NJ (US)

(72) Inventor: Bryan Christopher Larish, Westfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 393 days.

(21) Appl. No.: 17/232,456

(22) Filed: Apr. 16, 2021

(65) Prior Publication Data

US 2022/0337570 A1    Oct. 20, 2022

(51) Int. Cl.
     *H04L 9/40*      (2022.01)
     *H04L 9/32*      (2006.01)
     *H04L 9/00*      (2022.01)

(52) U.S. Cl.
     CPC ............ *H04L 63/08* (2013.01); *H04L 9/3247* (2013.01); *H04L 63/123* (2013.01); *H04L 9/50* (2022.05); *H04L 2463/121* (2013.01)

(58) Field of Classification Search
CPC ...... H04L 63/08; H04L 9/3247; H04L 63/123
USPC .......................................................... 726/4
See application file for complete search history.

(56) References Cited

U.S. PATENT DOCUMENTS

| | | | | |
|---|---|---|---|---|
| 10,291,395 B1* | 5/2019 | Nenov | ................. | H04L 9/3226 |
| 10,540,209 B2* | 1/2020 | Wang | ................... | H04L 9/3247 |
| 10,541,886 B2* | 1/2020 | Bathen | ................... | H04L 67/104 |
| 11,048,723 B2* | 6/2021 | Madhavan | ............ | G06Q 40/04 |
| 2002/0069165 A1* | 6/2002 | O'Neil | .................... | G06Q 20/24 |
| | | | | 705/40 |
| 2013/0221093 A1* | 8/2013 | Patel | .................... | G06Q 20/401 |
| | | | | 235/379 |
| 2015/0059003 A1* | 2/2015 | Bouse | ..................... | G06F 21/31 |
| | | | | 726/28 |
| 2017/0083854 A1* | 3/2017 | Elyea | ................. | G06F 16/9554 |
| 2017/0236123 A1* | 8/2017 | Ali | ..................... | G06Q 20/3825 |
| | | | | 705/75 |

(Continued)

OTHER PUBLICATIONS

Buldas et al., "Efficient Quantum-Immune Keyless Signatures with Identity," Computer Science (2014).

(Continued)

*Primary Examiner* — Dant B Shaifer Harriman

(57) ABSTRACT

Disclosed are systems and methods for performing distributed, keyless authorized electronic transactions. The disclosed systems and methods provide an electronic transaction framework where hardware and/or software devices can be used to authenticate users and/or authorize transactions involving such users. The disclosed framework operates as a distributed system in that it can be built without an entity that all parties must trust. The framework relies entirely on one-way functions and avoids using both symmetric and asymmetric cryptography; therefore, the framework does not have secret keys that can be compromised. The framework provides a distributed, electronic authorization system that does not require a reference clock to which components are synchronized, thereby enabling dynamic, agile authorization with improved security for user and transactional data.

16 Claims, 7 Drawing Sheets

(56) References Cited

U.S. PATENT DOCUMENTS

| | | | | |
|---|---|---|---|---|
| 2017/0250972 | A1* | 8/2017 | Ronda | H04L 9/0891 |
| 2018/0096313 | A1* | 4/2018 | Chenard | G06F 21/64 |
| 2018/0183600 | A1* | 6/2018 | Davis | G06Q 20/388 |
| 2018/0189732 | A1* | 7/2018 | Kozloski | G06F 8/71 |
| 2018/0323980 | A1* | 11/2018 | Ahn | H04L 9/3236 |
| 2019/0018984 | A1* | 1/2019 | Setty | H04L 9/3239 |
| 2019/0028277 | A1* | 1/2019 | Jayachandran | H04L 9/3247 |
| 2019/0156302 | A1* | 5/2019 | Tonio | G06Q 20/40 |
| 2019/0245856 | A1* | 8/2019 | Irwan | H04L 9/0643 |
| 2019/0378352 | A1* | 12/2019 | Dey | G07C 5/008 |
| 2020/0005316 | A1* | 1/2020 | Wagner | G06Q 20/3224 |
| 2020/0128043 | A1* | 4/2020 | Xie | H04L 9/3239 |
| 2020/0320490 | A1* | 10/2020 | Yeap | H04L 9/50 |
| 2021/0166219 | A1* | 6/2021 | Vasa | G06Q 20/065 |
| 2021/0232547 | A1* | 7/2021 | Ramabaja | H04L 9/3263 |
| 2022/0337570 | A1* | 10/2022 | Larish | H04L 63/08 |
| 2023/0063172 | A1* | 3/2023 | Liberman | G06Q 20/0655 |
| 2023/0206347 | A1* | 6/2023 | Whitley | G06F 21/64 705/30 |

OTHER PUBLICATIONS

Buldas et al., "Keyless signature infrastructure and PKI: hash-tree signatures in pre- and post-quantum world," International Journal of Services Technology and Management (2017).

Lamport, Leslie, "Password Authentication with Insecure Communication," Communications of the ACM, vol. 24, No. 11, pp. 770-772 (1981).

Nakamoto, Satoshi, "Bitcoin: A Peer-to-Peer Electronic Cash System," (2008).

Nguyen et al., "Deep Learning for Deepfakes Creation and Detection: A Survey," (2019).

Perrig et al., "The TESLA Broadcast Authentication Protocol," In CryptoBytes, 5:2, pp. 2-13 (2002).

* cited by examiner

SYSTEM AND METHOD FOR DISTRIBUTED, KEYLESS ELECTRONIC TRANSACTIONS WITH AUTHENTICATION

BACKGROUND INFORMATION

Electronic transactions are generally conducted between multiple parties while maintaining a high degree of confidence that the parties have in fact authorized the transaction. For example, voting in an election, financial exchanges, property transfers, credit card purchases, and even logging into a computer are all electronic transactions in which security and identity are critical. Currently, however, the legitimacy of electronic transactions, including the identity of its participants and the data being exchanged, has become subject to scrutiny.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Recently there have been attempts to adapt token-based authentication systems for use within transaction authorization systems. However, a vast majority of the systems rely on symmetric or asymmetric cryptography (also referred to herein as crypto). The disclosed framework improves upon these systems by retaining the benefits of token-based authentication while eliminating the security risks associated with cryptographic keys. This is because, among other reasons, crypto-keys in these systems become a primary source of risk. Fundamentally, cryptographic keys are reusable, and there is a risk of compromise every time a key is used. In symmetric crypto, keys must be shared among multiple entities, and therefore the trustworthiness of the system is only as good as the least trustworthy entity. Asymmetric cryptography requires complex calculations that are difficult to implement on low-cost hardware devices. Moreover, public-key infrastructures can be expensive and difficult to maintain, and they use algorithms that are susceptible to quantum attacks.

The disclosed systems and methods address these shortcomings, among others, and provide a novel electronic transaction framework where hardware and/or software devices can be used by participants (or users, used interchangeably) to authenticate themselves and authorize transactions in which they are participating. The disclosed framework operates as a distributed system in that it can be built and implemented without an entity that all parties must trust, which minimizes the trust needed between entities. The framework relies entirely on "hard to invert" one-way functions, which are mathematical functions that take variable length input strings and convert them into a fixed-length binary sequence, and avoids using both symmetric and asymmetric cryptography; therefore, the framework eliminates the security risks associated with using and managing cryptographic keys (e.g., the framework does not have nor does it use secret keys that can be compromised).

According to some embodiments, the disclosed framework leverages distributed ledger technology and utilizes hash-chain-based signatures. As discussed herein, the disclosed systems and methods provide novel protocols for hash-chain-based digital signatures that do not require a reference clock to which all system components are synchronized. This enables simplification of the devices participants use to authorize a transaction. Thus, according to some embodiments, the disclosed framework provides mathematical proof that an entity was authenticated and subsequently authorized a transaction. As discussed herein, according to some embodiments, the framework can be implemented in a manner that allows entities to authorize electronic transactions using a low-cost device, such as, for example, a credit card.

Figure 1:
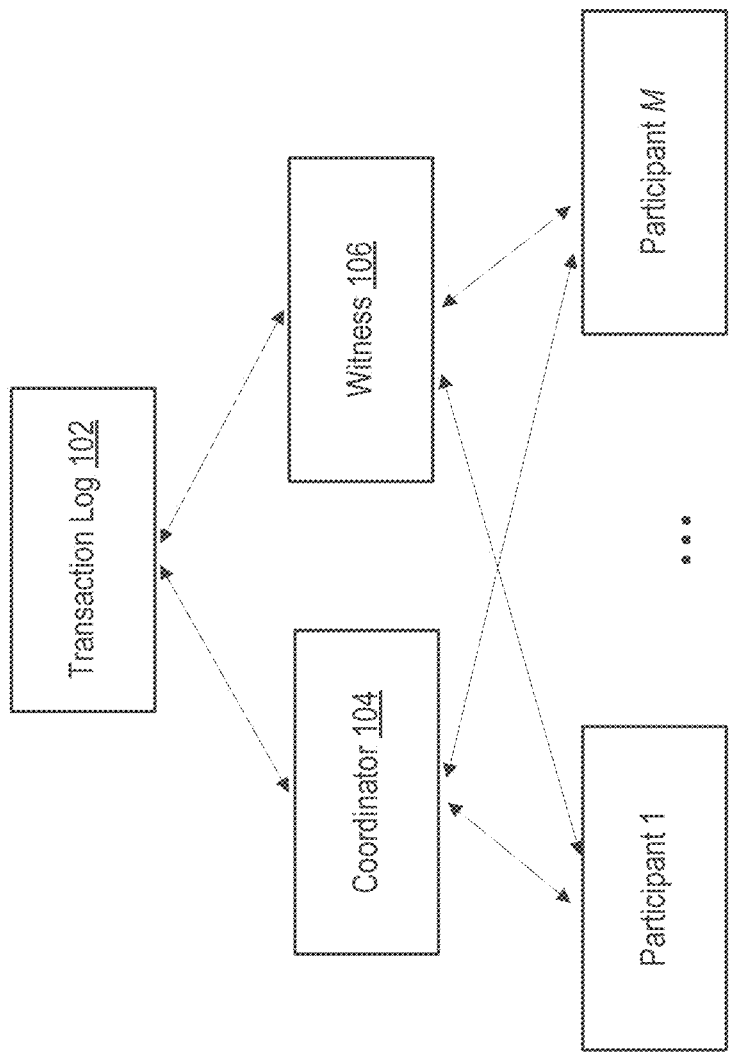
FIG. 1 is a block diagram of an example network configuration of entities according to some embodiments of the present disclosure.

With reference to FIG. 1, the disclosed framework 100 is modular which provides a benefit that minimal requirements are placed on the different components so that "best-of-breed" implementations can be selected for a particular type of transaction. Framework 100 includes four types of entities: transaction log entity 102, coordinator entity 104, witness entity 106 and participants 1-M (which are operating on signing devices 1-M). As discussed below, framework 100 can include any number of entities operating as a coordinator entity 104, witness entity 106 and/or participant 1-M.

In some embodiments, transaction log entity 102 (which can be a distributed ledger, database(s), data structure hosted on a network, and the like) records evidence that a transaction took place. In some embodiments, prior recorded entries cannot be modified. Contrary to conventional systems that are built on specific databases (e.g., Blockchain, for example), the disclosed transaction log entity 102 is applicable to any type or form of record log, data structure or storage medium, whether known or to be known, as discussed below.

In some embodiments, a coordinator entity 104 orchestrates the activities required to complete a transaction. In some embodiments, a witness entity 106 ensures the transaction log 102 has written its next entry. The witness entity 106 can securely receive transmission broadcasts from the transaction log entity 102, and, as discussed below, keeps its hash chain's future elements (or values) confidential. In some embodiments, one or more participants (participants 1-M) use a signing device(s) to record their participation in or approval of a transaction. The signing devices keep each participant's hash chain's future elements confidential, as discussed below.

Non-limiting exemplary embodiments of the configurations and operations of each entity (e.g., entities 102, 104, 106 and 1-M) operating within or as part of framework 100 are discussed in more detail below in relation to FIGS. 3-5. In some embodiments, each entity of framework 100 can be embodied as a device, engine, module, or some combination thereof.

Figure 2:
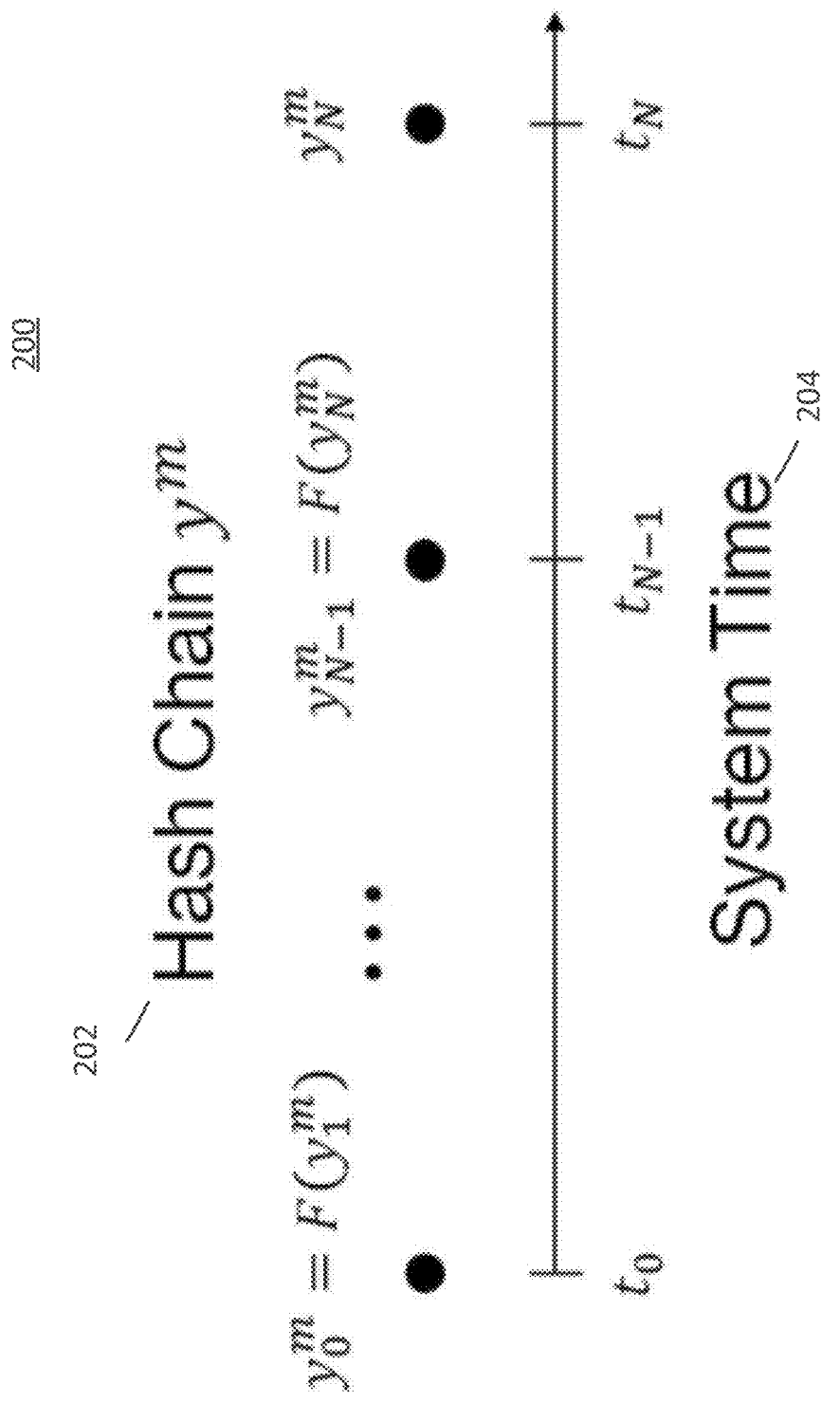
FIG. 2 depicts a non-limiting example embodiment of a hash chain according to some embodiments of the present disclosure.

According to some embodiments, framework 100 operates by utilizing hash chains built using one way functions. FIG. 2 provides an example embodiment 200 of improved transactional security using hash-chain-based signatures according to the disclosed systems and methods.

Embodiment 200 illustrates hash chain $y^m$ 202 and system time 204. In some embodiments, hash chain 202 is defined as the sequence $y_0^m, y_1^m, \ldots y_N^m$, where $y_i^m = F(y_{i+1}^m)$ for $i \in \{0, \ldots, N-1\}$, $F(\cdot)$ is a one-way function, where $y_N^m$ is an initial seed, and where m identifies a specific hash chain under consideration.

According to some embodiments, as discussed below, the functionality of the one-way function in hash chain 202 prevents a hash chain entry from being reverse engineered to its inverse image (or preimage). That is, an image of a function is the set of all output values it can produce from certain inputs. The preimage is the reverse engineering to the input values, which is rendered impossible due to hash chain 202 being a one-way function.

Thus, according to some embodiments, it may not be possible to calculate a future element of the hash chain 202 given a previous element since that would require calculating the preimage of F, and that violates the properties of a one-way function. That is, given $y_i^m$, it can be impossible to derive $y_{i+j}^m$ for any positive integer j. However, the disclosed framework can validate that $y_{i+j}^m$ is a future element of the hash chain for $y_i^m$ iteratively applying $F(\cdot)$ to $y_{i+j}^m$ a total of j times, thereby ensuring the resulting output equals $y_i^m$. Therefore, $F^j(y_{i+j}^m) = y_i^m$ can be validated; however, $F^{-j}(y_i^m)$ cannot be calculated.

In some embodiments, system time 204 is assigned a notion of time that steps through timestamps, $t_i = i$ where $i \in \{0, 1, 2, \ldots\}$. Each element of the hash chain 202 is associated with a timestamp. For example, a hash chain element $y_i^m$ corresponds to timestamp $t_i$, as illustrated in FIG. 2.

According to some embodiments, a unique hash chain is assigned to certain entities. For example, entity m is associated with the hash chain that has entries $y_i^m$. According to some embodiments, each entity builds its hash chain internally using a random number generator (e.g., to create the hash chain's secret initial seed $y_N^m$) and a component for calculating $F(\cdot)$ (to derive the remaining $y_i^m$).

According to some embodiments, entities are required to keep the elements of their hash chain 202 confidential until system time 204 has stepped past the elements' corresponding timestamps. After the system has stepped past a timestamp, the corresponding element in a hash chain 202 is no longer secret and can be made public. In some embodiments, element $y_i^m$ in a hash chain 202 mush be kept secret before the system reaches timestamp $t_i$, and can be made public thereafter.

According to embodiments of the disclosure, the security constraints of keeping elements private until its corresponding timestamp has been observed (e.g., has passed) ensures entity m is the only entity in the system (or on the network) that knows the value of $y_i^m$ before that hash chain element is made public.

By way of a non-limiting example, a transaction event occurs at timestamp $t_i$. An entity authorizes that event by producing, at the time the event occurs, evidence that it possesses an element from its hash chain corresponding to a future timestamp. In this example, the entity produces evidence it possesses $y_j^m$ where $t_j > t_i$; therefore, since the entity is the only one in possession of that hash chain, the entity keeps future elements of the hash chain secret until the proper time (e.g., $t_j > t_i$), and indeed, future elements of the hash chain cannot be calculated at the current time and/or by an outside entity, only that particular entity could have produced that specific piece of evidence at time $t_i$. In some embodiments, the evidence produced can be in the form of the hash chain element itself or some derived value that cannot be forged (e.g., $F(y_j^m)$).

As opposed to conventional transaction systems, in which security is contingent on multiple parties managing shared secrets (e.g., credit card number, symmetric encryption keys) or a public-key infrastructure (PKI) to support asymmetric cryptography, the disclosed type of hash-chain-based system is secure as long participants in a transaction keep their hardware or software token(s) secure. Thus, because the system is timestamp-synchronized to a transaction log, the need or reliance on a trusted server to timestamp signatures as in a PKI is eliminated.

Figure 3:
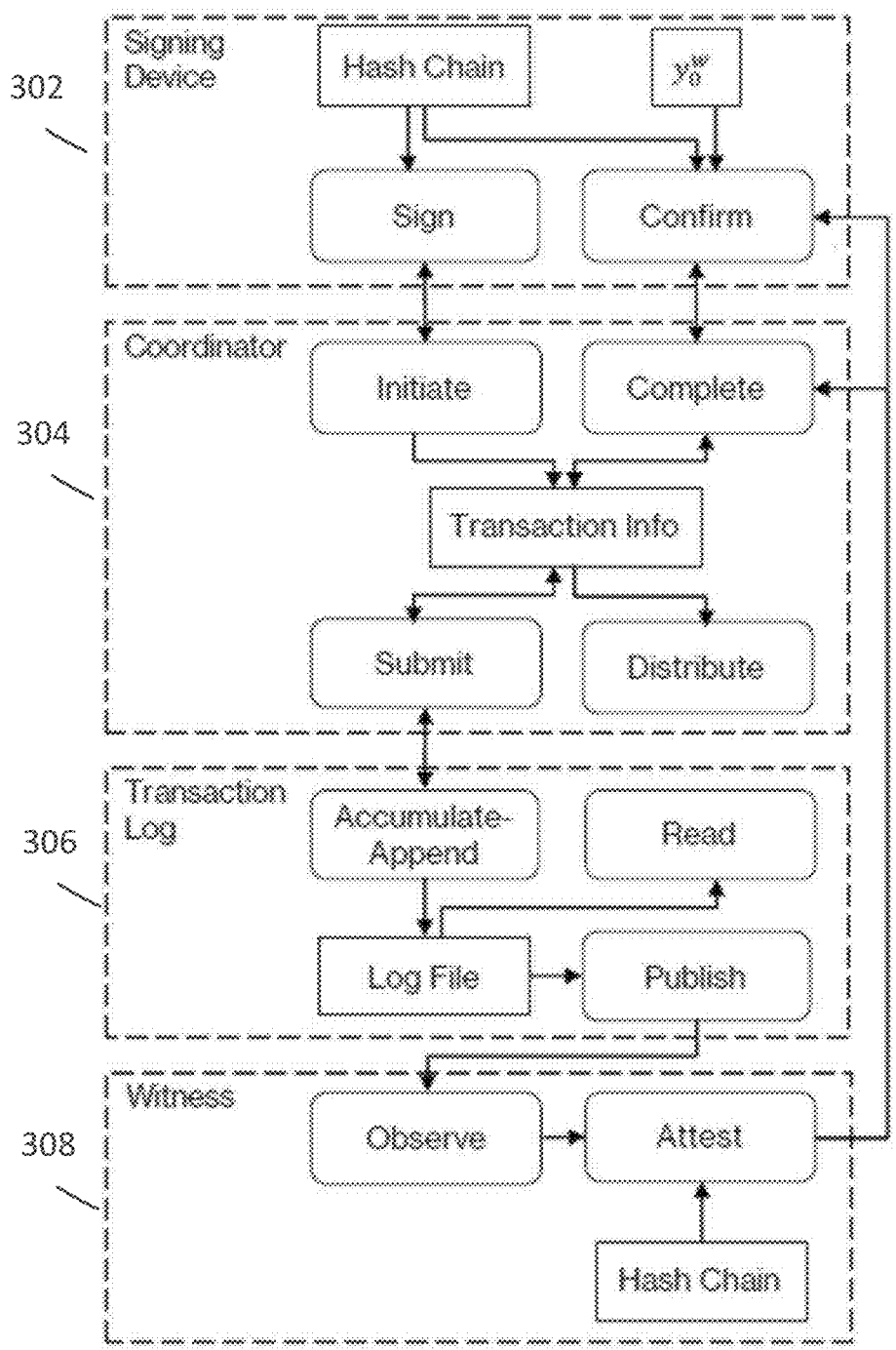
FIG. 3 illustrates a non-limiting example of a data flow in a system according to some embodiments of the present disclosure.

Turning to FIG. 3, framework 300 is depicted which presents a non-limiting example of a system architecture according to some embodiments of the present disclosure. Framework 300, which is an expanded view of framework 100 of FIG. 1, includes signing device 302 (which is associated with a participant 1-M, as discussed above in relation to FIG. 1), coordinator entity 304, transaction log entity 306 and witness entity 308. It should be understood that framework 300 is an example of the disclosed systems and methods, as each entity can represent more than one entity—for example, coordinator entity 304 can represent a plurality of coordinators; however, for purposes of explanation, a single coordinator entity 304 is depicted.

Transaction log entity 306 serves as the source of truth about which transactions have occurred as well as the reference to which all other entities are timestamp-synchronized. As shown in FIG. 3, the transaction log 306 contains a globally-readable, append-only log file with entries $L_i$ and has three functions, as follows:

A first function is "Accumulate-Append" (also referred to as "Accumulate"), which includes instructions for receiving transaction submissions from coordinator entity 304 for recording in the log file, and replying with the timestamp, $t_i$, that corresponds to the log entry where they were stored, along with evidence, $e_i$, that can be used to prove they were recorded in log entry $L_i$.

A second function is "Publish", which includes instructions to broadly disseminate the latest log entry, $L_i$ and timestamp, $t_i$.

A third function is to "Read", which includes instructions that allow any entity to either request the current log entry and current timestamp, or a specific past entry by providing a historical timestamp.

According to some embodiments, transaction log entity 306 operates by having its Accumulate-Append function collect transactions submitted by coordinator entity 304 and appending them to the log file such that log entry $L_i$ includes all transactions the Accumulate-Append function received since it wrote log entry $L_{i-1}$.

According to some embodiments, the transaction log entity 306 can be synchronized as follows. When the transaction log entity 306 writes log entry $L_i$, the current system time advances to timestamp $t_i$ and all entities advance their understanding of the current time to $t_i$.

According to some embodiments, the type of evidence the transaction log entity 306 provides can depend on its implementation. The type of evidence can be in reference to whether evidence is provided and/or in what form (e.g., a timestamp related to a log entry or a summary of all transactions, for example). An implementation can relate to a type of transaction, type of users involved, type of data being exchanged, and the like, or some combinations thereof. For example, if the $L_i$ contains a list of the transactions submitted, evidence e can be omitted since only the index where the transactions are stored is required to prove a transaction was recorded. In some embodiments, a summary of all transactions can be stored, and this can be based on a type of implementation. In such embodiments, the summary can be stored as evidence $e_i$, which can include additional details to prove the transaction was included in the summary stored in $L_i$.

According to some embodiments, transaction log entity 306 comprises an append-only log file that can be accessed by coordinator entity 304 and witness entity 308. According to some embodiments, the transaction log entity 306 can be configured in a distributed manner with multiple nodes such that no one node needs to be trusted by any entity.

According to some embodiments, witness entity 308 acts as the trusted entity that assures a signing device(s) 302 it is safe to reveal their hash chain elements. As shown in FIG. 3, the witness entity 308 contains a hash chain with elements $y_i^w$ and has two functions, as follows:

A first function is to "Observe", which includes instructions to view the entries of the transaction log entity 306 as they are published and record the current system time.

A second function is to "Attest", which includes instructions to confirm its understanding of the current system time by responding to a request with $y_k^w$.

According to some embodiments, witness entity 308 can have a secure communications channel to the transaction log entity 306, which enables witness entity 308 to view legitimate log entries. According to some embodiments, the channel between the witness entity 308 and the transaction log entity 306 is the only secure channel the framework 300 requires. According to some embodiments, witness entity 308 allows for the elimination of the need for a signing device 302 to have a secure communications channel to the transaction log entity 306. Eliminating this requirement means the signing device(s) 302 can be implemented with lower-cost hardware form factors.

According to some embodiments, the hash chain elements of the witness entity 308 remain confidential before system time reaches their corresponding timestamp, as discussed above in relation to FIG. 2. The minimal requirements associated with witness entity 308 enable it to embody a hardened device (e.g., a device with applied security features, such as, for example, binary hardening techniques, kernel patches, firewalls, and the like) with a minimized attack surface (e.g., access points or vectors where unauthorized access to a device is obtainable via compromised credentials, poor encryption, ransomware, phishing, brute force attacks, malware, and the like), therefore ensuring its hash chain data is securely maintained and hidden until the appropriate time.

According to some embodiments, each participant (e.g., participants 1-M from FIG. 1) are associated with a signing device 302 that contains a hash chain with elements $y_i^m$. In some embodiments, since $y_0^m$ is a public value, it can be used as a unique identifier for the hash chain. According to some embodiments signing device 302 stores the initial public value $y_0^w$ for each trusted witness entity 308.

As shown in FIG. 3, signing device 302 uses two functions during transactions, as follows:

A first function is to "Sign", which includes instructions to label (or authorize) a received $\{F(T), t_j\}$ pair (where F(T) relates to a one-way hash chain function F for particular transaction T, and $t_i$, represents an initial timestamp) for a transaction a participant intends to approve by responding with F(T), $y_0^m$ and $a_m$, where $a^m = F(F(T) \| y_j^m)$ is an authorization code.

A second function is to "Confirm", which includes instructions to verify a transaction with evidentiary timestamp $t_j$ by confirming $y_k^w$ is from a hash chain of a trusted witness entity 308 and $t_k > t_j$, and then returning F(T), $y_0^m$ and $y_j^m$ if they are.

According to some embodiments, determining how a participant will review T to ensure it is a transaction it wishes to authorize is a critical implementation decision. To maintain the framework 300's security abilities, a participant must not use their signing device 302 to approve transactions they do not want to authorize because, once they do, they can only de-authorize it via some implementation-specific, out-of-band mechanism.

According to some embodiments, one approach to addressing this, however, is by adding a display functionality to a signing device 302 (e.g., implementing it as a smartphone app) and having a coordinator entity 304 send T to the signing device 302 instead of F(T).

In some embodiments, another approach is for coordinator entity 304 to display or send T directly to a participant via an out-of-band mechanism. For example, in a retail transaction, the point-of-sale (POS) terminal can visually display the purchase information to a participant making a purchase or a merchant could text the purchase information to the participant. The primary consideration with this second approach is ensuring the T viewed by the participant corresponds to the F(T) used by the Sign function of the signing device 302. The second approach involves the usage by the participant of a second, more capable device (e.g., smartphone) that can receive and display T, calculate and display F(T), and establish a trusted communications channel to the participant's signing device 302. After the signing device 302 receives F (T) from the coordinator entity 304, it can send that value to the second device where the participant can ensure it corresponds to the T it received. Because the channel between the signing device 302 and the second device is trusted, it is known that the value signed by the signing device 302 is legitimate; and, because the participant controls both devices, the secure channel can be established in a low-cost manner. The benefit of this approach over the first is that the signing device 302 can be implemented in a lower-capability form factor.

In contrast to the Sign function, the participant's transaction approval cannot be contingent on the Confirm function. In some embodiments, this may be because all $y_i^m$ eventually becomes public information, and, therefore $y_i^m$ cannot be secured (e.g., kept confidential) indefinitely.

In some embodiments, with regard to the Confirm function, a participant may only need to ensure the transaction log entity 306 has written an entry, $L_k$, where $t_k > t_j$. Therefore, if the participant does not want to trust a 3rd-party witness entity (e.g., a bank, the government, and the like), the participant can establish a secure channel directly to the Read function of the transaction log entity 306. This option comes at the expense of potentially more complex implementation of the signing device 302 or viewing $L_k$ via an out-of-band mechanism.

In some embodiments, coordinator entity 304 can adjust the timing of its communications or create decoy communications to prevent attackers from interfering with other transactions occurring within a similar time period.

According to some embodiments, the hash chain elements of the signing device 302 remain confidential before system time reaches the corresponding timestamp. Since the hardware requirements on a signing device 302 are minimal, they can be implemented using a variety of form factors that are optimized for a particular type of transaction by trading off between size, functionality and physical hardening. For example, smart cards, Universal Serial Bus (USB) sticks and Near-Field Communication (NFC) FOBs all are capable of generating a random $y_N^m$, calculating one-way functions, validating two hash chain values are equal, and storing hash chains.

According to some embodiments, coordinator entity 304 acts as the orchestrator of a transaction. In some embodiments, a coordinator entity 304 is configured to shut down (e.g., stop operating or halt a transaction entirely) should it detect it, or other entities within framework 300, are compromised. This prevents compromised coordinators from executing fraudulent transactions. In some embodiments, coordinator entity 304 can have temporary storage for the different pieces of transaction information that it collects as a transaction executes. In some embodiments, however, it may not have permanent storage for the collected information, as when a transaction is complete and the transaction log entity 306 is updated, the information can be purged or deleted from coordinator entity 304.

As illustrated in FIG. 3, coordinator entity 304 uses the following four functions to orchestrate a transaction:

A first function is "Initiate", which includes instructions to commence a transaction by compiling the transaction record and evidentiary timestamp (T and $t_j$, respectively), storing the values, identifying participants that should authorize the transaction and sending F(T) and $t_j$ to the identified participant's signing devices 302. The instructions further include composing the responses from the signing devices 302 into an authorization vector $A=\{a^0, \ldots a^M\}$ and authorizers vector $Y=\{y_0^0, \ldots, t_0^M\}$, storing Y and A, and then calling the Submit function after all required signing devices 302 have responded.

A second function is "Submit", which includes instructions for sending A to the transaction log entity 306 for recording, and storing the reply $t_i$ and $e_i$.

A third function is "Complete", which includes instructions for finalizing a transaction by requesting the transaction's participants have their signing devices 302 send a confirmation, compiling the responses into a confirmation vector $C=\{\ldots, y_j^0, \ldots, y_j^M\}$, and then storing C after all required signing devices 302 have responded.

A fourth function is to "Distribute", which includes instructions for sending a transaction receipt message $R=\{t_i, t_j, e_i, T, Y, A, C\}$ to required entities (or entities that need/request it).

In some embodiments, coordinator entity 304 must be confident that $t_1$ is sufficiently far in the future so that transaction log entity 306 records A at a timestamp $t_i < t_j$. This requirement ensures a signing device(s) 302 is providing future information, which as discussed above, cannot be compromised. Therefore, if an $a^m$ of a signing device 302 corresponds to an evidentiary time $t_1$, the transaction log entity 306 must record it in an entry prior to entry $L_j$ to prove $a^m$ was from the future. In some embodiments, coordinator entity 304 can use a variety of mechanisms to select a $t_j$ that is in the future (e.g., get the current timestamp from the transaction log entity 306). According to some embodiments, how far into the future to select $t_j$ can either be a system parameter or a decision by coordinator entity 304 (which involves tradeoffs between robustness to denial-of-service (DoS) attacks and user-perceived responsiveness).

As mentioned above, while coordinator entity 304 is depicted as a single entity, it should not be construed as limiting, as any number of coordinators can be used without departing from the scope of the instant disclosure. Moreover, the functions and storage capabilities of coordinator entity 304 can also be split up and distributed across any number of entities on the network.

Figure 4:
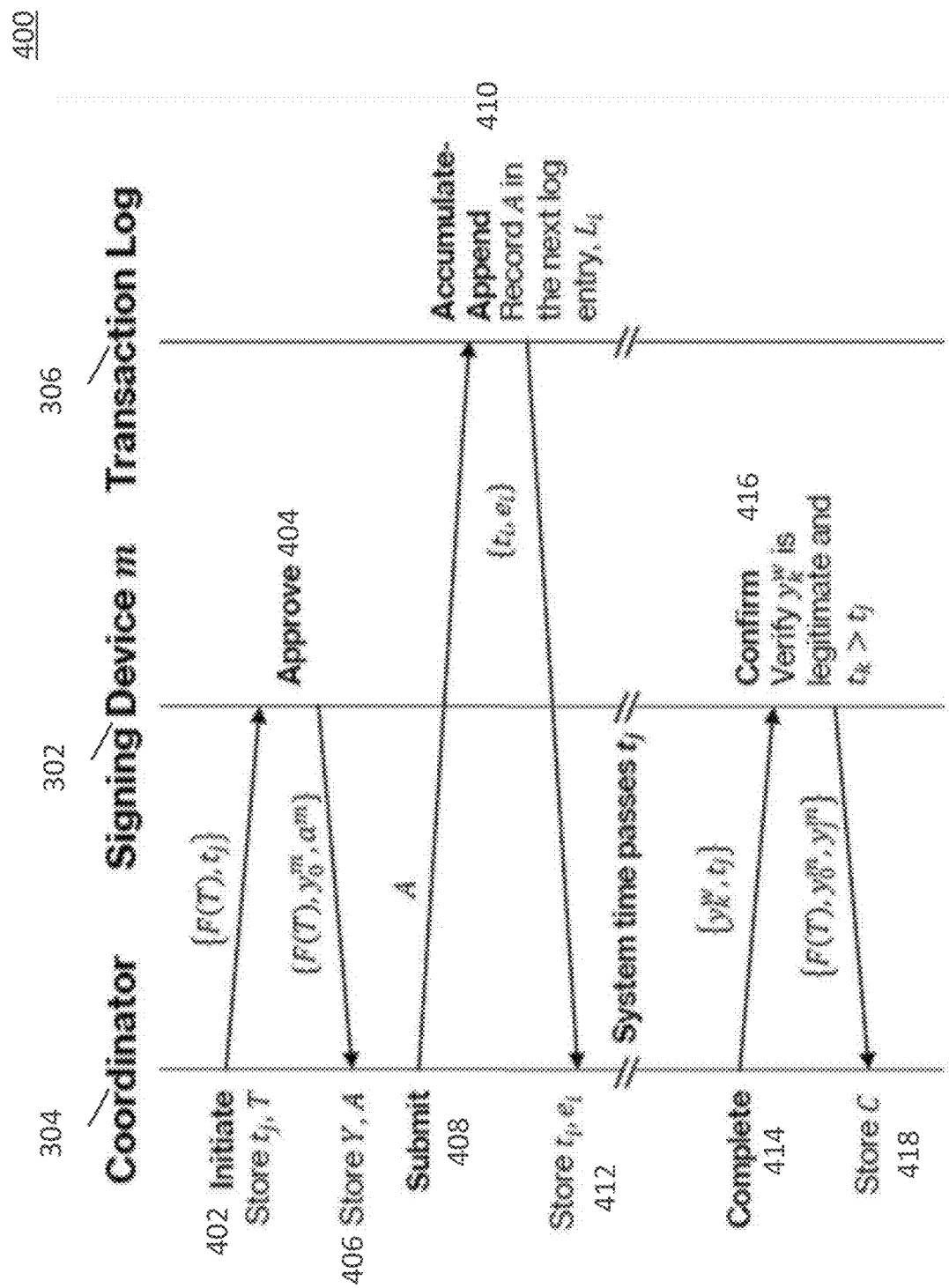
FIG. 4 illustrates a non-limiting example embodiment of a transaction protocol according to some embodiments of the present disclosure.

Turning to FIG. 4, Process 400 provides a non-limiting example of transaction operations performed by framework 300. The illustrated embodiment of Process 400 displays only one signing device; however, this should not be construed as limiting, as any number of signing devices can be implemented by participating entities without departing from the scope of the instant disclosure, as discussed above in relation to FIGS. 1 and 3.

Process 400 begins with Step 402 where the coordinator entity 304 calls its Initiate function to create T and $t_j$, temporarily store the two values, and send $\{F(T), t_j\}$ to signing device(s) 302 of the participant(s) for their authorization.

In Step 404, upon the signing device 302 receiving a transaction initiation request, a decision is made regarding whether to authorize the transaction (e.g., a participant(s) decides whether or not to authorize a transaction). If approved, the participant's signing device 302 calls its Sign function to generate and respond with F(T), $y_0^m$ and $a^m$. If the transaction is not approved, the request can be ignored, and will time-out after a threshold amount of time (e.g., a time period expires). In some embodiments, the transaction is then nullified.

In some embodiments, $y_0^m$ can be included in the response in Step 404 because some instances exist where the coordinator entity 304 may know how to communicate with a signing device 302 but not know an identifier of a signing device 302. For example, in a POS transaction, the POS terminal identifies the smart card presented as the signing device 302, but it does not know the smart card's ID until after the transaction is initiated. F(T) is included in the response so the coordinator entity 304 can associate it with the correct transaction without having to maintain a separate state for each transmitted message.

In Step 406, when coordinator entity 304 receives authorization codes from all required signing devices 302, it forms and temporarily stores Y and A. Then, in Step 408, coordinator entity 304 calls its Submit function to send A to the transaction log entity 306 for recording.

In Step 410, the Accumulate function of the transaction log entity 306 receives A and appends it to the log file entry $L_i$ (corresponding to timestamp $t_i$). In Step 412, $t_i$ and $e_i$ are sent back to the coordinator entity 304 for temporary storage.

After system time has progressed to a time $t_k$ that is beyond $t_1$, in Step 414, coordinator entity 304 calls its Complete function to send $y_k^w$ and $t_j$ to the signing device 302 in Y for transaction confirmation. In Step 416, upon receiving the completion request, signing device 302 calls its Confirm function to verify $y_k^w$ is legitimate and $t_k > t_j$, and replies with F(T), $y_0^m$, and $y_j^m$ if both conditions are true. In some embodiments, F(T) is included in the response so the coordinator entity 304 can associate it with the correct transaction without having to maintain separate state for each message.

In Step 418, after receiving all required confirmations, coordinator entity 304 calls its Complete function by compiling the confirmations into a confirmation vector $C=\{y_j^0, \ldots y_j^M\}$, and C is stored.

In some embodiments, the coordinator entity 304 can then call its Distribute function to generate $R=\{t_i, t_j, e_i, T, Y, A, C\}$, which as discussed above, serves as portable evidence that can be used to definitively prove the participants authorized the transaction.

Figure 5:
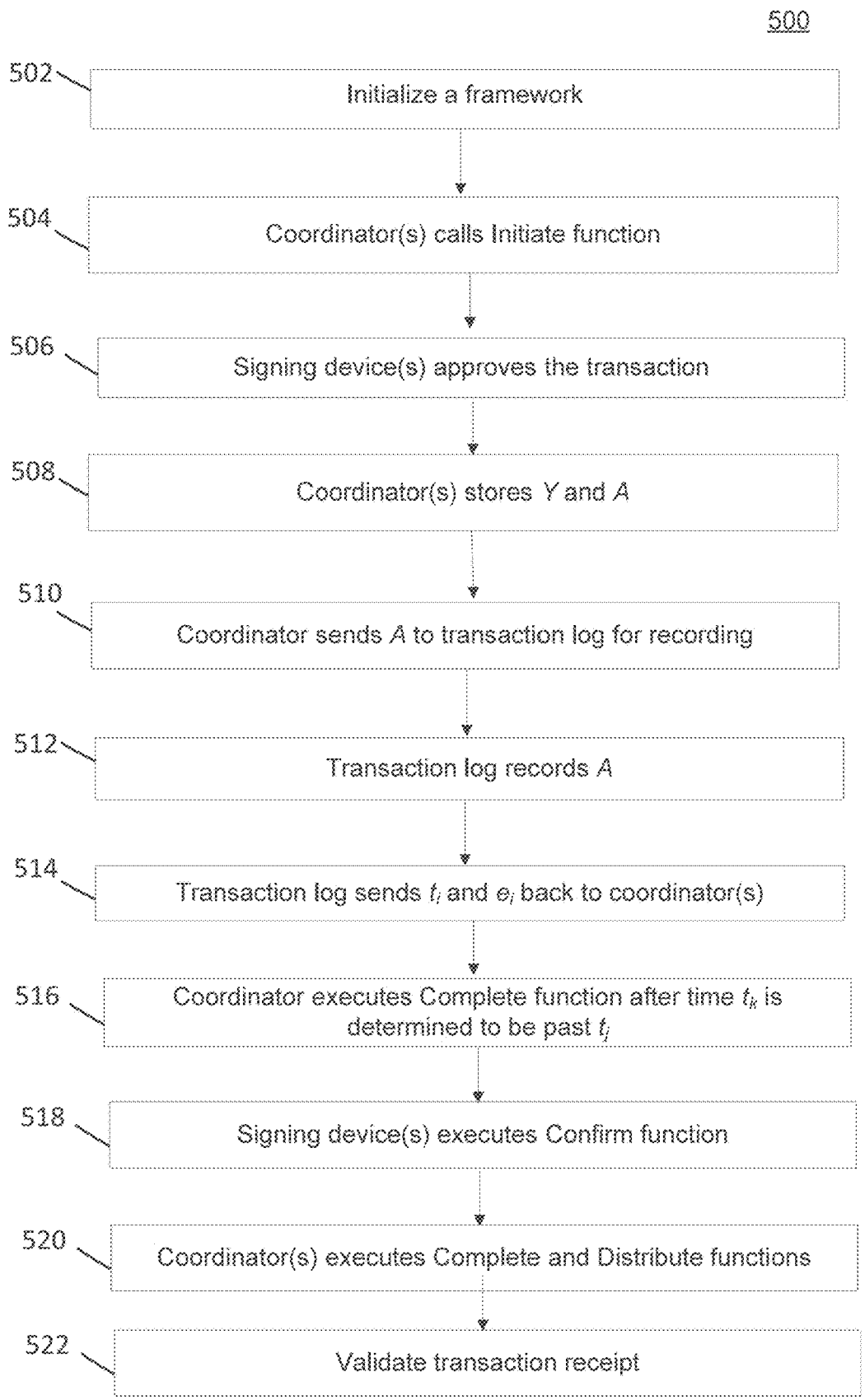
FIG. 5 illustrates an exemplary data flow according to some embodiments of the present disclosure.

Turning to FIG. 5, Process 500 provides a non-limiting exemplary flow diagram of the transaction operations performed by framework 300 as discussed above in relation to Process 400 of FIG. 4.

In some embodiments, any modification of the data and/or values exchanged between the different entities in framework 300, temporarily stored by the controller entity 304, and/or contained in the transaction receipt (e.g., the elements of T, A, C) can cause the validation protocol to fail. The values from a transaction cannot be used to spoof a different transaction since A is tied to a particular T via a one-way function, and C is only released once its values are public. Therefore, the only way an attacker can craft an illegitimate transaction that passes the disclosed validation protocol is by tricking or forcing a participant into using their signing device 302 to sign a transaction they did not wish to authorize.

According to some embodiments, as mentioned above, DoS attacks can and may happen; however, framework 300 is configured to reduce the risks of them being successful through a minimized number of intermediaries. In some embodiments, the coordinator entity 304 and/or witness entity 308 can be incorporated into other system entities, thereby providing an option to eliminate separate entities (e.g., eliminating a witness, as the coordinator and witness are combined under the operations of a single entity, for example).

In some embodiments, as mentioned above, a value of $t_1$ can be selected to tradeoff between robustness to DoS attacks and a longer time needed to complete a transaction. To make the framework 300 more robust, the coordinator entity 304 can select a $t_1$ further into the future to give the system ample time to respond to an attack and yet still record the transaction's A in the transaction log entity 306 before $t_1$. Thus, framework 300's robustness to DoS attacks can be measured by the number of timestamps it has to recover from an attack, $\Delta=t_j-t_i$, where $t_i$ is the current time. Therefore, in some embodiments, A is also a measure of the framework's responsiveness and can be tuned for particular types of transactions.

Process 500 begins with Step 502 where the framework 300 is initialized. In some embodiments, this can involve identifying participants, the signing devices, how many and a location of the coordinators, witness(es), the transaction log, a transaction type, transaction amount, and the like, or some combination thereof.

In some embodiments, initialization involves identification of which signing devices are involved, and how to assign signing devices to participants in the transaction given each device's secret $y_N^m$ and trusted $y_0^w$. In some embodiments, this can involve either pre-populating the values and using a trusted shipping method, or using a signature device with a random number generator (to generate $y_N^m$) and read-only memory (for pre-populating $y_0^w$).

The former approach requires participants to trust more entities. The latter approach requires participants to have a more complex device.

In some embodiments, initialization involves identifying a database that maps the signature devices' IDs, $y_0^m$, to a real-world entity to which the device corresponds. For example, in a system for property transfers, the government must associate a $y_0^m$ with a person or other legal entity. Depending on the type of transaction, the database could be public or private. How and whether it is populated for either device initialization or revocation also depends on the transaction type and is tied to the distribution of signature devices discussed above.

In some embodiments, Step 502 involves receiving a request from a participant's signing device to execute a transaction of type n, where the request identifies another signing device or entity upon which data must be securely transferred. In some embodiments, the coordinator entity 304 can receive this request and orchestrate the transaction accordingly.

The following steps of Process 500 provide non-limiting example embodiments of Process 400 of FIG. 4, and proceed according to the steps of Process 400 discussed above. For example, Steps 504-520 correspond to Steps 402-418 of FIG. 4, respectively.

In Step 504, the coordinator entity 304 calls its Initiate function to create T and $t_j$, temporarily store the two values and send $\{F(T), t_j\}$ to the identified signing devices 302 of the participants of the transaction. Step 504 is performed in a similar manner as Step 402 of FIG. 4, as discussed above.

In Step 506, upon the signing devices 302 of the participants receiving a transaction initiation request, a decision is made regarding whether to authorize the transaction (e.g., a participant(s) decides whether or not to authorize a transaction). Step 506 is performed in a similar manner as Step 404 of FIG. 4, as discussed above.

In Step 508, when coordinator entity 304 receives authorization codes from the signing devices 302 of the participants, it forms and temporality stores Y and A. Then, in Step 510, coordinator entity 304 calls its Submit function to send A to the transaction log entity 306 for recording. Steps 508-510 are performed in a similar manner as Steps 406-408 of FIG. 4, respectively.

In Step 512, transaction log entity 306 performs a record operation through the Accumulate function of the transaction log entity 306 receiving A and appending it to the log file entry $L_i$ (corresponding to timestamp $t_i$). In Step 514, transaction log entity 306 sends $t_i$ and $e_i$ back to the coordinator entity 304 for temporary storage. Steps 512-514 are performed in a similar manner as Steps 410-412 of FIG. 4, respectively.

Process 500 proceeds to Step 516 where time is monitored until it has reached a timestep, $t_k$, beyond $t_j$, upon which Step 516 enables the coordinator entity 304 to call its Complete function to send $y_w^k$ and $t_j$ to the signing device(s) 302 in Y for transaction confirmation. In Step 518, upon receiving the completion request, signing device 302 calls it Confirm function to verify $y_k^w$ is legitimate and $t_k>t_j$, and replies with F(T), $y_0^m$ and $y_j^m$ if both conditions are true. Steps 516-518 are performed in a similar manner as Steps 414-416 of FIG. 4, respectively.

In Step 520, after receiving all required confirmations, coordinator entity 304 forms C by calling the Complete function, and temporality stores C. In some embodiments, Step 520 can involve the coordinator entity 304 calling the Distribute function to generate transaction receipt $R=\{t_i, t_j, e_i, T, Y, A, C\}$.

In Step 522, transaction receipt R is validated. According to some embodiments, such validation involves determining (or validating): i) that $t_j > t_i$ (e.g., validates that all evidence came from a future timestamp); ii) that there is at least one yjfl in C, for each $y_o^m$ in Y, such that $y_j^m = F(y_o^m)$ (e.g., validates C came from the signing devices in Y); iii) there is at least one $a_m$ in A, for each $y_o^m$ in Y, such that $a^m = F(F(T) \| y_j^m)$ (e.g., validates A came from the signing devices in Y and the signing devices authorized T); and iv) that A, using $e_i$, is recorded in the transaction log at $L_i$ (e.g., validates that A was created at timestamp $t_i < t_j$).

If any of the determinations/validations of Step 522, then the transaction is not legitimate. In some embodiments, a coordinator entity 304 may contact a signature device 302 at the conclusion of Step 522 to confirm that the signing device 302 used for the transaction was not lost or stolen before timestamp $t_i$.

According to some embodiments, detailed below is an example use case embodiment that provides a non-limiting example implementation of the disclosed systems and methods. For example, in a retail transaction, a consumer and a merchant are executing a transaction where the consumer is allowing the merchant to draw funds from the consumer's bank account in exchange for goods. The consumer possesses a signing device issued by their bank. In some embodiments, the bank can bootstrap the system by deciding how the signing device will be distributed to the consumer, deciding how $y_o^m$ and $y_o^w$ get placed on the signing device, and maintaining the mapping of $y_o^m$ to the consumer's bank account. In some embodiments, the merchant can act as the coordinator. In some embodiments, for a transaction where it will take time for the merchant to deliver the goods, it may also be required (e.g., the consumer may decide) that the merchant use a signing device to authorize the transaction. This prevents the merchant from later denying authorizing the transaction when the merchant is acting as the coordinator entity. In some embodiments, the bank can act as the witness, since funds will be taken from the consumer's bank account and their bank has liability for properly maintaining the bank account. In some embodiments, the transaction log can be implemented using any ledger technology the bank feels is robust enough to lower the risk of fraud to a level with which they are comfortable.

In terms of transaction execution, the merchant and consumer have multiple options and are only limited by the communications channels the signing device(s) supports. For example, if the signing device of the consumer is a secure smartphone, the transaction can be completed via text messages. In another non-limiting example, if the signing device is a smartcard, the transaction can be completed with a traditional POS system.

From a business perspective, the primary benefits are that the bank reduces the number of resources it spends on antifraud efforts, and the consumer and merchant can execute the transaction with less friction since there are no intermediaries needed between the merchant and the bank once the merchant possesses receipt R.

Figure 6:
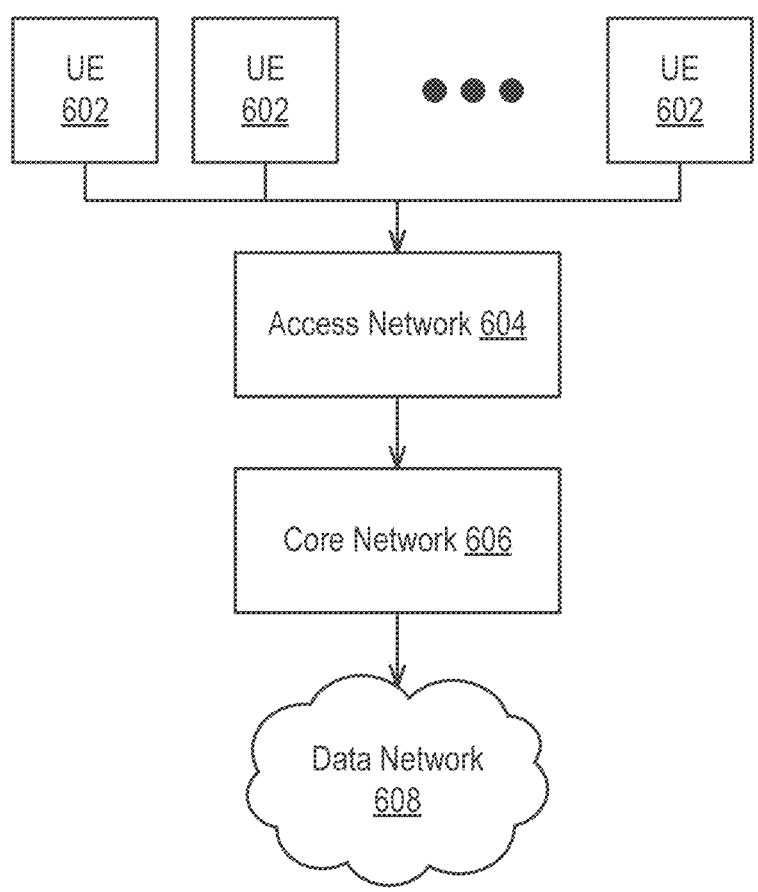
FIG. 6 is a block diagram of an example network architecture according to some embodiments of the present disclosure.

FIG. 6 is a block diagram of an example network architecture according to some embodiments of the present disclosure. In the illustrated embodiment, user equipment (UE) 602 accesses a data network 608 via an access network 604 and a core network 606. In the illustrated embodiment, UE 602 comprises any computing device capable of communicating with the access network 604. As examples, UE 602 may include mobile phones, tablets, laptops, sensors, Internet of Things (IoT) devices, autonomous machines, and any other devices equipped with a cellular or wireless or wired transceiver. One example of a UE is provided in FIG. 7.

In the illustrated embodiment, the access network 604 comprises a network allowing over-the-air network communication with UE 602. In general, the access network 604 includes at least one base station that is communicatively coupled to the core network 606 and wirelessly coupled to zero or more UE 602.

In some embodiments, the access network 604 comprises a cellular access network, for example, a fifth-generation (5G) network or a fourth-generation (4G) network. In one embodiment, the access network 604 and UE 602 comprise a NextGen Radio Access Network (NG-RAN). In an embodiment, the access network 604 includes a plurality of next Generation Node B (gNodeB) base stations connected to UE 602 via an air interface. In one embodiment, the air interface comprises a New Radio (NR) air interface. For example, in a 5G network, individual user devices can be communicatively coupled via an X2 interface.

In the illustrated embodiment, the access network 604 provides access to a core network 606 to the UE 602. In the illustrated embodiment, the core network may be owned and/or operated by a mobile network operator (MNO) and provides wireless connectivity to UE 602. In the illustrated embodiment, this connectivity may comprise voice and data services.

At a high-level, the core network 606 may include a user plane and a control plane. In one embodiment, the control plane comprises network elements and communications interfaces to allow for the management of user connections and sessions. By contrast, the user plane may comprise network elements and communications interfaces to transmit user data from UE 602 to elements of the core network 606 and to external network-attached elements in a data network 608 such as the Internet.

In the illustrated embodiment, the access network 604 and the core network 606 are operated by an MNO. However, in some embodiments, the networks (604, 606) may be operated by a private entity and may be closed to public traffic. For example, the components of the network 606 may be provided as a single device, and the access network 604 may comprise a small form-factor base station. In these embodiments, the operator of the device can simulate a cellular network, and UE 602 can connect to this network similar to connecting to a national or regional network.

In some embodiments, the access network 604, core network 606 and data network 608 can be configured as a multi-access edge computing (MEC) network, where MEC or edge nodes are embodied as each UE 602, and are situated at the edge of a cellular network, for example, in a cellular base station or equivalent location. In general, the MEC or edge nodes may comprise UEs that comprise any computing device capable of responding to network requests from another UE 602 (referred to generally as a client) and is not intended to be limited to a specific hardware or software configuration a device.

Figure 7:
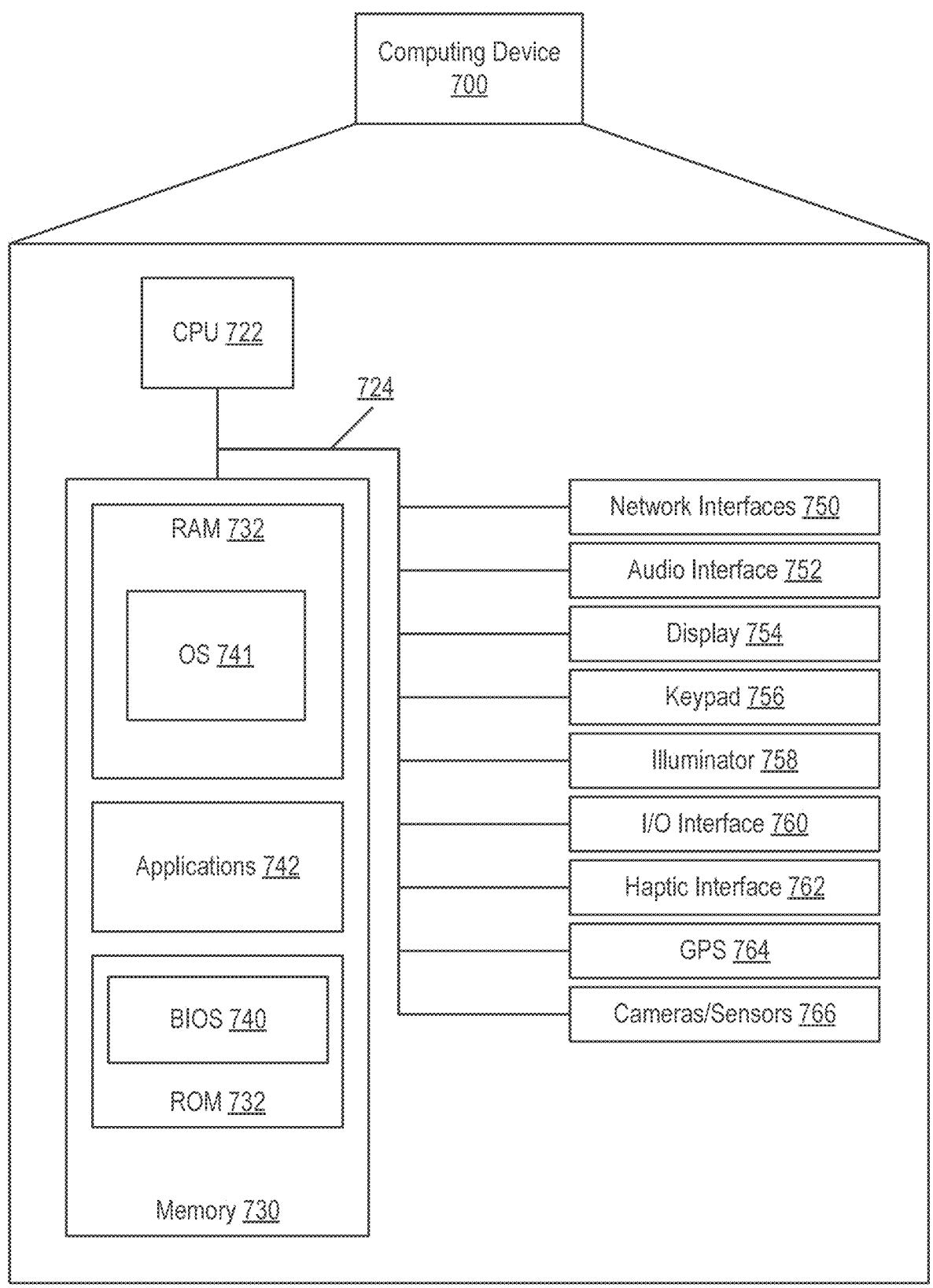
FIG. 7 is a block diagram illustrating a computing device showing an example of a client or server device used in various embodiments of the present disclosure.

FIG. 7 is a block diagram illustrating a computing device showing an example of a client or server device used in the various embodiments of the disclosure.

The computing device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, GPS receivers 764, or cameras/sensors 766. Some devices may include additional components not shown, such as graphics processing unit (GPU) devices, cryptographic co-processors, artificial intelligence (AI) accelerators, or other peripheral devices.

As shown in FIG. 7, the device 700 includes a central processing unit (CPU) 722 in communication with a mass memory 730 via a bus 724. The computing device 700 also includes one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741 for controlling the operation of the computing device 700.

Applications 742 may include computer-executable instructions which, when executed by the computing device 700, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them to RAM 732 again.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The optional GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, by a coordinator entity on a network, a request related to an electronic transaction involving a device of a user;
   creating and storing, by the coordinator entity, a transaction record and a first timestamp in a transaction log;
   sending, by the coordinator entity, a transaction initiation request based on the transaction record and the first timestamp to the device;
   receiving, by the coordinator entity from the device, a response comprising device-generated data indicating approval of the electronic transaction and an authorization code;
   generating, by the coordinator entity, an authorization vector and an authorizer vector based on the device-generated data;
   recording, by the coordinator entity, in the transaction log, information related to the authorization vector;
   receiving, by the coordinator entity from the transaction log, evidence data, the evidence data indicating recordation of the information in the transaction log and a second timestamp associated with the recordation;
   communicating, by the coordinator entity, to the device, information related to the authorizer vector to the device;
   receiving, by the coordinator entity, from the device, confirmation data indicating device verification of the electronic transaction and a third timestamp;
   confirming, by the coordinator entity, the electronic transaction based on the confirmation data, the confirmation enabling execution of the electronic transaction, wherein the confirmation of the electronic transaction comprises:
      generating a confirmation vector based on the confirmation data; and
      storing the confirmation vector in the transaction loci; and
   generating, by the coordinator entity, a transaction receipt, the transaction receipt comprising information related to the first, second and third timestamps, the evidence data, the authorization vector and authorizer vector, and the confirmation vector.

2. The method of claim 1, wherein the transaction initiation request comprises a one-way function of the transaction record and the timestamp.

3. The method of claim 1, further comprising:
   validating the transaction receipt by:
      validating that the evidence data is associated with a future timestamp;
      validating that the confirmation vector is associated with the device identified in the authorizer vector;
      validating that the authorization vector is associated with the device identified in the authorizer vector; and
      validating that the authorization vector was generated after a time associated with the first timestamp.

4. The method of claim 1, wherein the electronic transaction further comprises utilizing a device associated with another user to authorize the transaction, wherein authorization by the other user device is required for the transaction receipt to be generated.

5. The method of claim 1, further comprising monitoring, by a witness entity, that the first, second and third timestamps each occur sequentially in time.

6. The method of claim 1, wherein the coordinator entity temporarily stores the device-generated data, wherein the device-generated data is deleted after the confirmation of the electronic transaction.

7. The method of claim 1, wherein the coordinator entity temporarily stores the evidence data, wherein the evidence data is deleted after the confirmation of the electronic transaction.

8. The method of claim 1, wherein when a time period expires before the response to the transaction initiation request is received, the transaction is nullified.

9. The method of claim 1, wherein the storage of the information in the transaction log comprises identifying a next log entry, and storing the information in the identified next log entry.

10. The method of claim 1, wherein the transaction log is a distributed ledger on the network.

11. The method of claim 1, wherein the device of the user is a signing device associated with an account of the user.

12. The method of claim 1, wherein the device of the user is a smartphone, the smartphone comprising an application accessing an account of the user.

13. A computing device comprising:
a processor configured to:
receive, over a network, a request related to an electronic transaction involving a device of a user;
create and store a transaction record and a first timestamp in a transaction log;
send a transaction initiation request based on the transaction record and the first timestamp to the device;
receive, from the device, a response comprising device-generated data indicating approval of the electronic transaction and an authorization code;
generate an authorization vector and an authorizer vector based on the device-generated data;
record in the transaction log, information related to the authorization vector;
receive, from the transaction log, evidence data, the evidence data indicating recordation of the information in the transaction log and a second timestamp associated with the recordation;
communicate, to the device, information related to the authorizer vector to the device;
receive, from the device, confirmation data indicating device verification of the electronic transaction and a third timestamp;
confirm the electronic transaction based on the confirmation data, the confirmation enabling execution of the electronic transaction, wherein the confirmation of the electronic transaction comprises:
generating a confirmation vector based on the confirmation data; and
storing the confirmation vector in the transaction loci; and
generate a transaction receipt, the transaction receipt comprising information related to the first, second and third timestamps, the evidence data, the authorization vector and authorizer vector, and the confirmation vector.

14. The computing device of claim 13, wherein the processor is further configured to:
validate the transaction receipt, the validation performed to:
validate that the evidence data is associated with a future timestamp;
validate that the confirmation vector is associated with the device identified in the authorizer vector;
validate that the authorization vector is associated with the device identified in the authorizer vector; and
validate that the authorization vector was generated after a time associated with the first timestamp.

15. A non-transitory computer-readable medium tangibly encoded with instructions, that when executed by a processor, perform a method comprising:
receiving, by a coordinator entity on a network, a request related to an electronic transaction involving a device of a user;
creating and storing, by the coordinator entity, a transaction record and a first timestamp in a transaction log;
sending, by the coordinator entity, a transaction initiation request based on the transaction record and the first timestamp to the device;
receiving, by the coordinator entity from the device, a response comprising device-generated data indicating approval of the electronic transaction and an authorization code;
generating, by the coordinator entity, an authorization vector and an authorizer vector based on the device-generated data;
record, by the coordinator entity, in the transaction log, information related to the authorization vector;
receiving, by the coordinator entity from the transaction log, evidence data, the evidence data indicating recordation of the information in the transaction log and a second timestamp associated with the recordation;
communicating, by the coordinator entity, to the device, information related to the authorizer vector to the device;
receiving, by the coordinator entity, from the device, confirmation data indicating device verification of the electronic transaction and a third timestamp;
confirming, by the coordinator entity, the electronic transaction based on the confirmation data, the confirmation enabling execution of the electronic transaction, wherein the confirmation of the electronic transaction comprises:
generating a confirmation vector based on the confirmation data; and
storing the confirmation vector in the transaction loci; and
generating, by the coordinator entity, a transaction receipt, the transaction receipt comprising information related to the first, second and third timestamps, the evidence data, the authorization vector and authorizer vector, and the confirmation vector.

16. The non-transitory computer-readable medium of claim 15, further comprising instructions for further performing a method further comprising the steps of:
validating the transaction receipt by:
validating that the evidence data is associated with a future timestamp;
validating that the confirmation vector is associated with the device identified in the authorizer vector;
validating that the authorization vector is associated with the device identified in the authorizer vector; and
validating that the authorization vector was generated after a time associated with the first timestamp.

* * * * *